United States Patent

[11] 3,574,428

| [72] | Inventors | Henry A. Johnson<br>8151 Inwood Ave., Dayton, Ohio 45415;<br>Gabe L. Campbell, Wayne Lakes,<br>Greenville, Ohio 45331 |
|---|---|---|
| [21] | Appl. No. | 839,931 |
| [22] | Filed | July 8, 1969 |
| [45] | Patented | Apr. 13, 1971 |

[54] FABRICATION OF HOLLOW BALLS, CONTAINING HEAT SINK MATERIAL, FOR BEARINGS
7 Claims, 4 Drawing Figs.

| [52] | U.S. Cl. | 308/195 |
|---|---|---|
| [51] | Int. Cl. | F16c 13/02 |
| [50] | Field of Search | 308/188, 193, 195; 29/148.4, 149.5 |

[56] References Cited
UNITED STATES PATENTS

| 3,485,542 | 12/1969 | Krysiak | 308/188 |
|---|---|---|---|
| 3,491,423 | 1/1970 | Haller | 308/188 |

*Primary Examiner*—Fred C. Mattern, Jr.
*Assistant Examiner*—Frank Susko
*Attorneys*—Harry A. Herbert, Jr. and Arthur R. Parker ABSTRACT: A hollow ball, or roller bearing structure fabricated from a pair of half shell members, each of which incorporates a heat sink for absorbing the heat developed during the operation of the bearing structure and thereby prolonging the bearing wear life capability.

PATENTED APR 13 1971 3,574,428
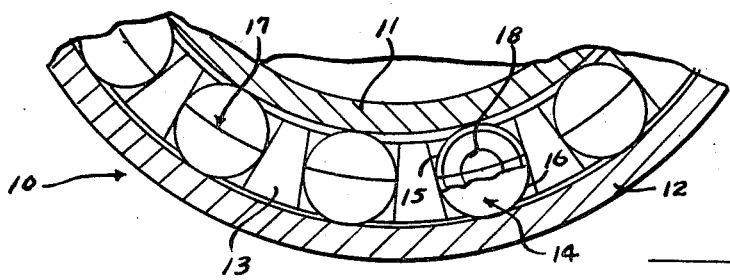
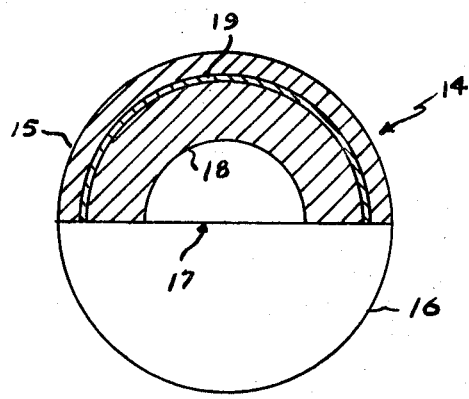
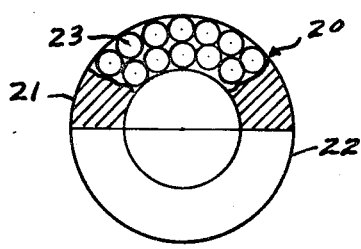
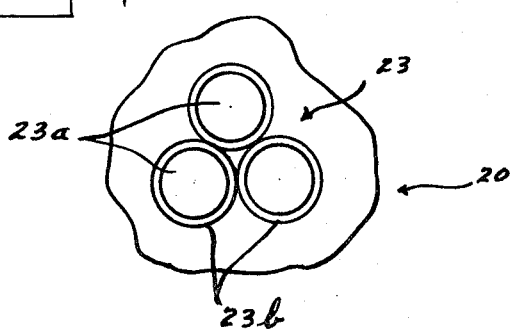
INVENTORS
HENRY A. JOHNSON
GABE L. CAMPBELL
BY Harry A. Herbert Jr.
ATTORNEY
Arthur R. Parker
AGENT

FABRICATION OF HOLLOW BALLS, CONTAINING HEAT SINK MATERIAL, FOR BEARINGS

BACKGROUND OF THE INVENTION

This invention relates generally to the hollow ball, or roller bearing field and, in particular, to use of heat-absorbing material in combination with the bearing structure to thereby prolong the bearing life particularly at higher speeds and loads.

The use of the hollow type of ball, or roller bearings has been previously proposed, particularly for bearing applications involving relatively high loads, and extreme rotational speeds. During such critical operations, considerable heat would, particularly in the case of the solid type of bearing, build up and result in expansion of the bearing. However, with the use of hollow balls and/or rollers, there is less mass present and, therefore, less heat will accumulate in the bearing. In this regard, with the additional use of a heat sink, as developed by the present invention, heat that is accumulated in the walls of the bearing members is absorbed and thus longer wear life of the bearing is assured. Said heat sink is utilized in the unique manner to be hereinafter set forth in the following summary and detailed description thereof.

SUMMARY OF THE INVENTION

The instant invention consists briefly in fabricating a hollow ball, or roller bearing member from a pair of half shell elements, each of which incorporates heat-absorbing or heat sink material in combination with the bearing material. This heat-absorbing or heat sink material may consist of a powdered beryllium, or some other suitable heat absorber which, in one form of the invention, may be applied as a separate element to the inside wall surface of each of said half shell members, or alternatively, it may actually be incorporated as an integral portion of the bearing wall surface itself to thereby provide for the absorption of heat occurring during the operation of the said bearing.

Other advantages, as well as objects of the present invention will become readily apparent from the following disclosure thereof, in which:

BRIEF DESCRIPTION OF THE DRAWING

FIG. 1 represents a partially broken-away view of one type of bearing assembly in which the improved ball, or roller bearing element of the present invention may be installed;

FIG. 2 is a relatively enlarged view, partly in cross section, of one form of the inventive ball, or roller bearing element that may be utilizable in the assembly of FIG. 1;

FIG. 3 is a second, relatively enlarged view, showing details of a second form of the inventive ball, or roller bearing element that may be incorporated in the assembly of FIG. 1; and FIG. 4 is still another relatively enlarged view, illustrating additional details of the second form of the invention shown in FIG. 3.

DESCRIPTION OF THE PREFERRED EMBODIMENT

Referring generally to the drawing and, in particular, to FIG. 1 thereof, one type of bearing assembly in which the novel ball, or roller bearing member of the present invention may be incorporated is shown generally at 10 as including an inner race 11, an outer race 12, and a cage element indicated generally at 13 for retaining a plurality of rolling bearing elements 14 in proper position between said inner and outer races 11, 12. It is to be understood that the said rolling bearing elements 14 may be formed either of ball, or roller configuration without departing from the true spirit or scope of the invention. The said ball, or roller bearing elements 14 are preferably hollow in form and, as such, each further consists of a pair of half shells, indicated more particularly at 15 and 16 in FIG. 2, for example. These half shells 15, 16, which may be either hemispherical, or semicylindrical in shape, depending on whether the ball or roller configuration is selected, may be bonded, or otherwise joined together along the joining line indicated generally at the reference numeral 17.

In accordance with the teaching of the present invention, a separate, heat-absorbing or heat sink element, of relatively enlarged dimension and constituting the key feature of the present invention, may be bonded or otherwise incorporated, as indicated at 18, on the inside wall surface of each of the said half shells 15, 16. To facilitate its mounting, or assembly to each half shell 15, 16, the aforementioned heat sink element 18, which is naturally configured to closely interfit with the inner surface of said half shells 15, 16, is covered with a thin layer of some relatively fast heat-absorbing material, as for example, silver. The latter element, which is depicted at 19 in FIG. 2, is interposed between the previously described heat sink element 18 and the inside wall surface of the half shell, such as that illustrated at 15. With this unique arrangement, the silver element 19, or other fast heat absorber, not only greatly facilitates the bonding of the heat sink element 18 to the half shell 15, 16, but in addition provides for the quick absorption of heat occurring on the surface of the ball, or roller bearing member 15, 16 during the operation thereof and the transfer of the heat so absorbed to the aforesaid heat sink element 18. The latter, in turn, ensures the rapid dissipation of the heat so transferred thereto. This latter heat-dissipating action of the said heat sink element 18 constitutes the principle feature of the present invention.

In the form of the invention depicted specifically in FIG. 2, the heat sink element 18, which may consist of powdered beryllium or other suitable heat-absorbing material, is fabricated or mounted as a separate element disposed on, and extending inwardly of the wall surface of each of the half shells 15, 16. In this modification of the invention, the separate heat sink element 18 is introduced and locked into a respective half shell 15, 16 prior to the bonding, or otherwise joining together of the latter two elements into a unitary ball, or roller bearing member. However, an alternate form of the invention is illustrated generally at 20 in FIGS. 3 and 4. In this modification, again, a pair of half shell members, indicated at 21 and 22, may be utilized to form either the requisite ball, or roller bearing configuration. The improved feature of this second form of the invention is that the wall surface itself of each half shell member 21, 22 may be fabricated from, or composed of, a novel and integral combination of bearing and heat sink material. Again, the said heat sink material may comprise powdered beryllium, or other appropriate heat absorbing medium, which may be uniquely placed in combination with a suitable bearing material, such as steel or iron, and further arranged to form the wall surface of each half shell member 21, 22 in the specific manner depicted generally and schematically at 23 in FIG. 3, for example. The aforesaid unique combination of the powdered beryllium-heat sink material and the bearing-steel or iron material may, for instance, be fabricated from individual powders compressed into the desired hemispheric, or half-cylindrical configuration comprising each of the half shell members 21, 22. More particularly, as seen in the more detailed view of FIG. 4, these separate powders, which are again indicated generally at 23, may each comprise a relatively enlarged preferably powdered beryllium core portion at 23a, in novel combination with a surrounding bearing material, such as steel or iron, indicated at 23b and which has been fused, or otherwise adhered thereto. Thus, with this unique arrangement, the wall surface per se of each half shell member 21, 22 is thereby formed with an integral, or built-in heat sink function which, by virtue of the plurality of heat sink material-core portions 23a, each formed with bearing material, such as iron or steel, previously indicated at 23b as disposed in surrounding relation thereto, is dispersed throughout the bearing structure and thus provides a significantly increased capability for heat dissipation in the ball, or roller bearing member fabricated with the improved features previously described for the present invention.

We claim:

1. In a ball, or roller bearing assembly having an inner race, an outer race, and a plurality of rolling members held in rolling contact between said inner and outer races; each of said rolling members comprising a pair of hemispheric, or semicylindrical shell members bonded or otherwise joined together to thereby form a unitary ball, or roller bearing; and heat-absorbing means operably associated with each of said shell members for dissipating heat generated on the surface of the ball, or roller bearing, and thus significantly prolong the operating life of the bearing member so formed; said heat-absorbing means including a separate heat sink element mounted to each of said pair of shell members, and further incorporating a thin, relatively fast heat absorbing and transferring element interposed intermediately between said heat sink element and the wall surface of a ball or roller bearing shell member corresponding thereto.

2. In a ball, or roller bearing assembly having an inner race, an outer race, and a plurality of rolling members held in rolling contact between said inner and outer races; each of said rolling members comprising a pair of hemispheric, or semicylindrical shell members bonded or otherwise joined together to thereby form a unitary ball, or roller bearing; and heat-absorbing means operably associated with each of said shell members for dissipating heat generated on the surface of the ball, or roller bearing, and thus significantly prolong the operating life of the bearing so formed; said heat-absorbing means comprising; an enlarged, heat sink member joined to the wall surface of a respective shell member; and a thin, heat conducting element positioned between and in contact with both of said heat sink, and shell members to thereby facilitate the dissipating and/or transfer of heat from the bearing surface, formed by said pair of shell members, to said heat sink member.

3. In a ball, or roller bearing assembly as in claim 2, wherein said thin, heat-conducting element comprises a relatively fast heat absorber to thereby promote the relatively quick transfer of heat from, and thus provide longer duration runs for said ball, or roller bearing.

4. In a ball, or roller bearing assembly as in claim 3, wherein said relatively fast, heat absorber may comprise silver.

5. In a ball, or roller bearing assembly as in claim 2, wherein said heat sink member may be comprised of a powdered metal.

6. In a ball, or roller bearing assembly as in claim 5, wherein said heat sink member may be comprised of powdered beryllium.

7. In a ball, or roller bearing assembly having an inner race, an outer race, and a plurality of rolling members held in rolling contact between said inner and outer races; each of said rolling members comprising a pair of hemispheric, or semicylindrical shell members bonded or otherwise joined together to thereby form a unitary ball, or roller bearing; and heat-absorbing means operably associated with each of said shell members for dissipating heat generated on the surface of the ball, or roller bearing, and thus significantly prolong the operating life of the bearing members so formed; the wall surface of each of said shell members comprising a plurality of powders compressed into a predetermined hemispherical, or semicylindrical bearing configuration, said powders each further consisting of a relatively enlarged, heat sink material core portion, and a relatively thin, bearing material surrounding portion enclosing, and being in rigid contact with, the periphery of said core portion to thereby provide a bearing surface having built-in heat absorption dispersed throughout each of the said pair of shell members comprising said ball, or roller bearing.